United States Patent [19]
Nelson et al.

[11] Patent Number: 6,128,447
[45] Date of Patent: Oct. 3, 2000

[54] INTERMEDIATE STORAGE UNIT FOR USE WITH ELECTRONIC FILM

[75] Inventors: David J. Nelson; Gregory J. Lukins, both of Rochester, N.Y.

[73] Assignee: Eastman Kodak Company, Rochester, N.Y.

[21] Appl. No.: 09/114,765

[22] Filed: Jul. 14, 1998

[51] Int. Cl.[7] .................................................. G03B 29/00
[52] U.S. Cl. ................................ 396/429; 348/64; 15/77
[58] Field of Search ........................ 396/321, 429; 348/64, 233; 358/909.1; 15/4, 21.1, 77, 102, 105

[56] References Cited

U.S. PATENT DOCUMENTS 5,561,458 10/1996 Cronin et al. ............................. 348/64
5,742,339 4/1998 Wakui ..................................... 348/233

*Primary Examiner*—Howard B. Blankenship
*Attorney, Agent, or Firm*—Thomas H. Close

[57] ABSTRACT

An intermediate storage unit for use with electronic film of the type having a body in the shape of a film cartridge and a tab, extending from the body and bearing an image sensor adapted to be located in the film plane of a conventional photographic camera and having electrical contacts for interfacing the electronic film with another electronic device, such as a computer. The intermediate storage unit includes a data connector for connecting to the electrical contacts on the tab of the electronic film and a communication interface connected to the data connector. A non-volatile semiconductor memory capable of storing at least twice as many images as the electronic film is provided in the storage unit. A microcontroller connected to communication interface and the non-volatile memory controls the transfer of data from the electronic film to the non-volatile memory.

15 Claims, 4 Drawing Sheets

INTERMEDIATE STORAGE UNIT FOR USE WITH ELECTRONIC FILM

FIELD OF THE INVENTION

The invention relates generally to the field of photography, and in particular to electronic photography. More specifically, the invention relates to an intermediate storage unit for storing digital images captured by electronic photography.

BACKGROUND OF THE INVENTION

Electronic film is intended as a direct replacement for silver halide film, commonly used in photographic cameras. It generally consists of a digital capture device, memory to store the captured image, an interface port to allow transfer of image data to external devices, and supervisory electronics which provide the system with its functionality. Due to inherent size constraints, electronic film does not provide very much storage capacity. Electronic film must also have a dedicated and independent power source since it is designed to be interchangeable amongst all existing 35 mm cameras. Again, due to size constraints, the capacity of the power source is also limited. Since the surface of the digital capture device is unprotected inside the camera, it will be subject to accumulation of dust and consequently will require periodic cleaning or image quality will degrade.

An electronic film system has recently been announced by Irvine Sensors Corporation, Costa Mesa, Calif., which includes a high resolution electronic image sensor attached to a tab extending from a body shaped like a 35 mm film cartridge. The tab extends from the cartridge shaped body to locate the image sensor in the film gate of a camera when the body is placed in the film compartment of the camera. The body contains a battery power supply and a non-volatile flash storage memory capable of storing 30 images. The tab extending from the body also includes a set of contacts that interface with a computer adapter cable so that the images can be downloaded into a personal computer. 30 Images are probably not sufficient for many photographers, thereby requiring them to either purchase more than one electronic film unit, or to carry a laptop computer for the purposes of downloading the images. Since the electronic film units are projected to be relatively expensive (about $1000), and laptop computers are also expensive and bulky, neither or these approaches is satisfactory. There is a need therefore for an improved means for handling the images from the electronic film.

SUMMARY OF THE INVENTION

The present invention is directed at overcoming one or more of the problems previously mentioned. Briefly summarized, according to one aspect of the present invention, an intermediate storage unit is provided for use with electronic film of the type having a body in the shape of a film cartridge and a tab, extending from the body and bearing an image sensor adapted to be located in the film plane of a conventional photographic camera and having electrical contacts for interfacing the electronic film with another electronic device such as a computer. The intermediate storage unit includes a data connector for connecting to the electrical contacts on the tab of the electronic film. A non-volatile semiconductor memory capable of storing at least twice as many images as the electronic film is also provided in the storage unit. A microcontroller connected to the non-volatile memory controls the transfer of data from the electronic film data connector to the non-volatile memory.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages. First, the intermediate storage device provides a large, portable storage area for holding previously captured images. This permits the photographer to shoot for extended periods of time without the inconvenience of a bulky and heavy laptop computer, or the need for multiple expensive electronic film devices. The intermediate storage device has the capability to recharge the electronic film device as well as the ability to clean the surface of the digital capture device thereby extending the useable period for the electronic film and improving the quality of captured images. Other aspects of the invention include a display device for reviewing stored images thereby improving the utility of the electronic film by providing image verification in the field.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
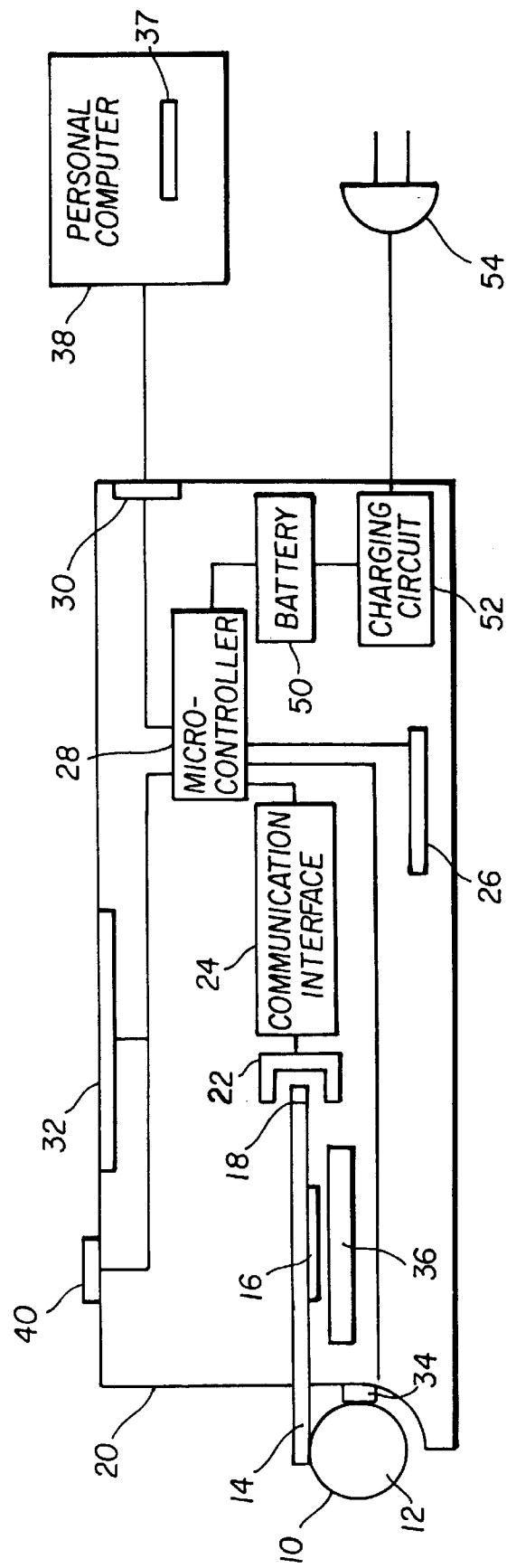
FIG. 1 is a schematic diagram of an intermediate storage unit for use with electronic film according to the present invention.

Beginning with FIG. 1, an intermediate storage unit for use with electronic film is shown. The electronic film, generally designated 10 includes a body 12 shaped like a conventional film cartridge. A tab 14 connected to the body 12 bears an image sensor 16 adapted to be located in the film gate of a conventional photographic camera (not shown). The tab also carries electrical contacts 18 for transferring image signals from a memory (not shown) located in the body 12.

The intermediate storage unit, generally designated 20, includes a connector 22 for connecting to the electrical contacts 18 on the electronic film. The connector 22 is connected to a communication interface 24, such as the MAX3244 from Maxim Integrated Products, for establishing a communication link between the electronic film and the intermediate storage unit 20.

The intermediate storage unit 20 includes a non-volatile semiconductor memory 26, such as the Intel Corp. model 28F320B3 32 megabit flash memory. Alternatively, the memory 26 comprises a removable memory such as a compact flash card that can be removed from the unit and inserted into a slot 37 on a personal computer 38. A microcontroller 28, such as a Motorola 68HC05 8-bit microcontroller is connected to the communication interface and the non-volatile memory 26, and controls the downloading of images from the electronic film to the storage unit 20. In the embodiment where the memory is not removable, an external communication interface port 30 provides a pathway for the intermediate storage unit 20 to transfer image data from the non-volatile memory 26 to the personal computer 38. The pathway can be either a physical link such as a parallel cable interface, or a non-contact communication link such as an IR or RF communication link. The downloading process is controlled by the personal computer 38. Operator controls 40 are provided to turn a display screen 32 on and off, and scroll the images stored in the non-volatile memory 26 across the display screen. It will be understood that the intermediate storage unit 20 may also download the images to any compatible image communication device, such as a printer, a set top box, fax machine, etc.

According to another aspect of the present invention, the intermediate storage unit 20 is provided with a switch 34 that is closed upon insertion of the electronic film into the connector 22. The switch 34 powers up the unit and causes the microcontroller 28 to download the images to the unit by sending an electrical signal to the microcontroller 28 to initiate the data transfer.

According to another aspect of the invention, the intermediate storage unit 20 includes a cleaner 36 that cleans any dust that may have accumulated on the surface of the image sensor 16. In a preferred embodiment this is a passive device such as a soft bristled brush which passes over the portion of the electronic film which fits in the film gate of the camera and which relies on the movement created when the user inserts or retracts the electronic film tab into the intermediate image storage device.

The electronic film 10 may contain a rechargeable battery (not shown), in which case the intermediate storage unit 20 includes a battery charging circuitry 52 that charges the battery in the electronic film via one or more of the electrical contacts 18. This charging is accomplished either with the intermediate storage unit's own high capacity battery 50, or from a charging circuit 52 that is connected to an AC power supply by plug 54. The intermediate storage unit's own battery 50 is also charged with the same charging circuit 52.

Figure 2:
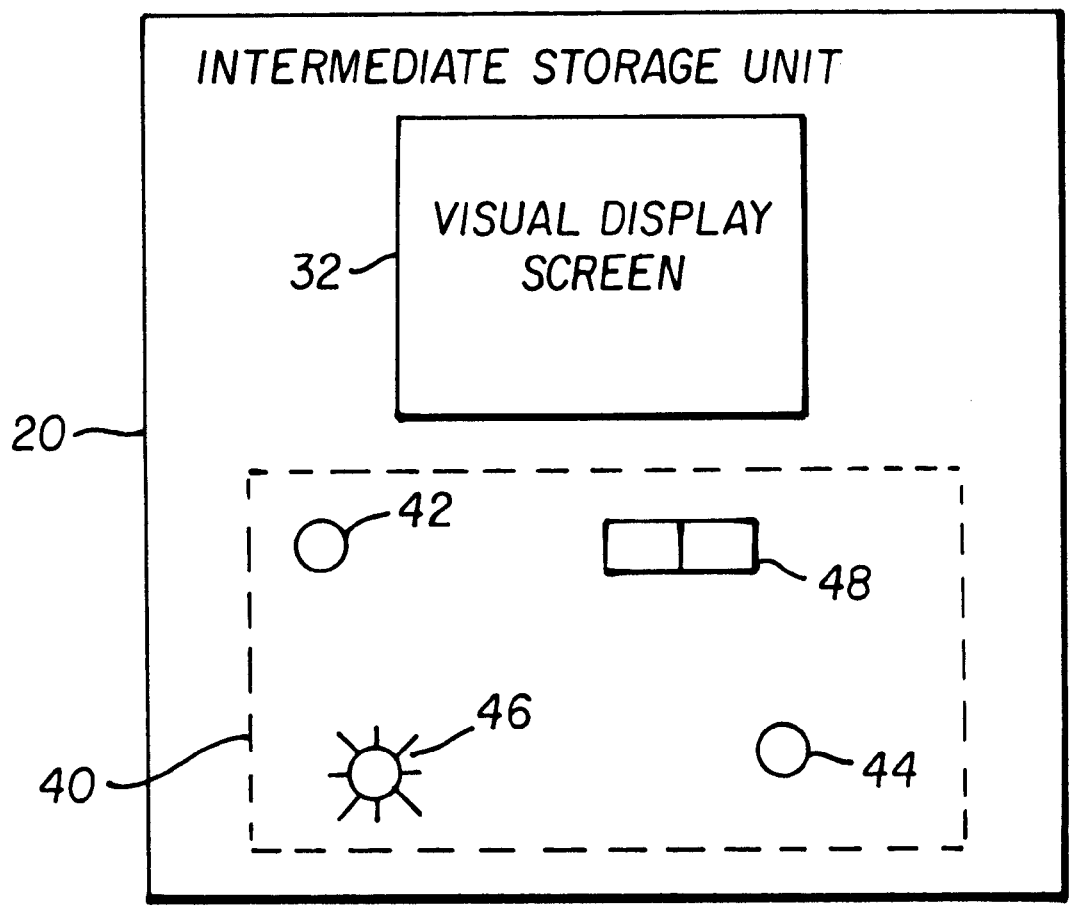
FIG. 2 is a top view of the intermediate storage unit, illustrating the controls for the display.

Turning now to FIG. 2, the visual display screen 32, such as an LCD display, for previewing the images stored in the non-volatile memory 26 is controlled by a switch 42 to turn the display on and off, a switch 44 to erase the memory in the electronic film, or the non-volatile memory 26 when there is no electronic film in the unit. A switch 48 is provided to scroll through the images stored in the non-volatile memory 26. Also included is an error indicator 46 which alerts the operator that the memory is approaching full, or other problem during normal operation.

Figure 3:
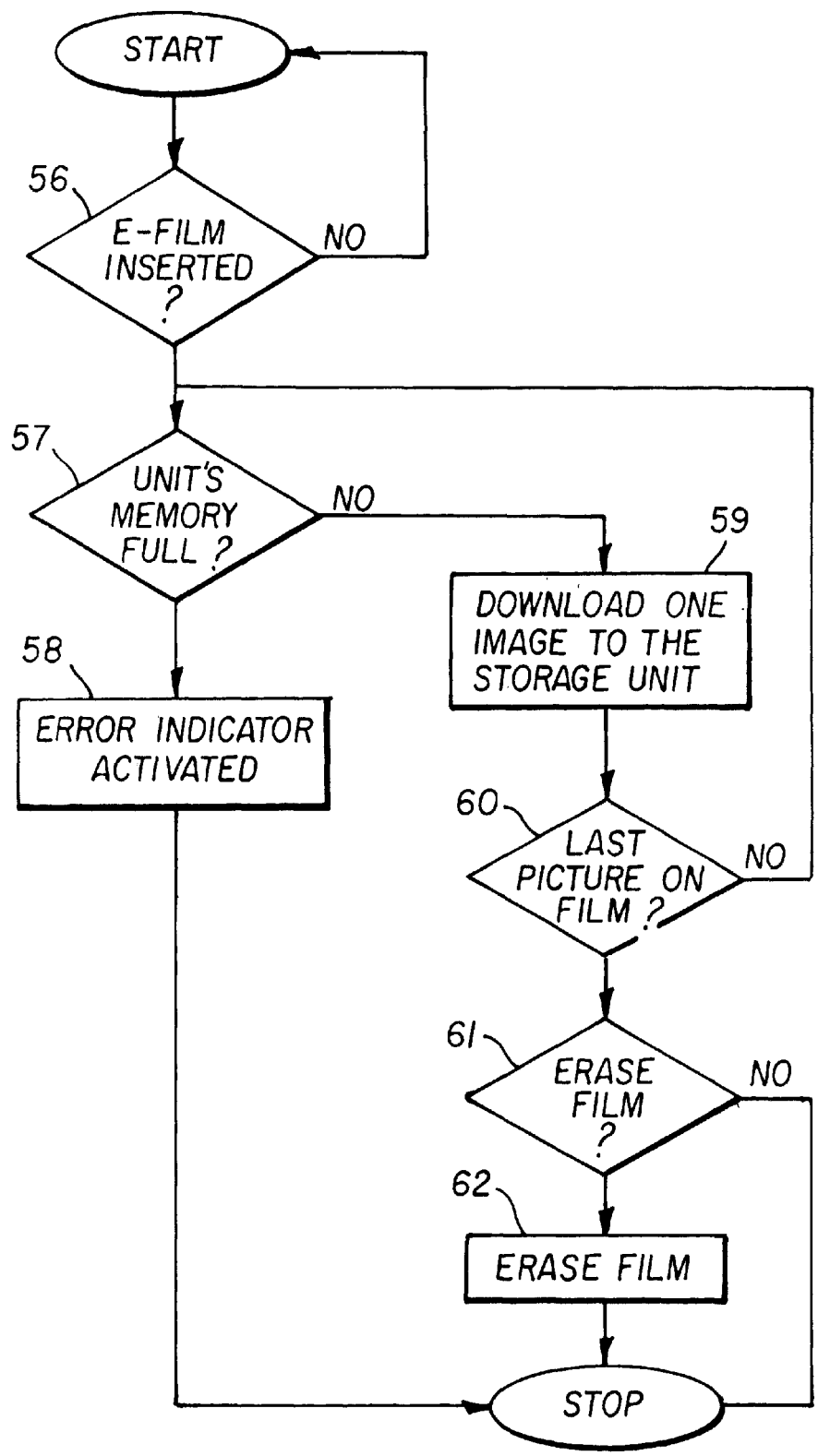
FIG. 3 is a flowchart showing the downloading operation for extracting images from the electronic film to the intermediate storage device.

Referring to FIG. 3, the intermediate storage unit 20 downloads images from the electronic film as follows. When an electronic film unit is inserted (56) in the storage unit, switch 34 is closed and the unit is powered up. When the microcontroller 28 senses that the switch has been closed, it next checks to see if the memory 26 is full (57). If the memory is full, then the error indicator 46 is activated (58). If the memory 26 is not full, then the microcontroller 28 downloads one image into the memory 26 (59). If the microcontroller determines that there are more pictures to download from the electronic film (60), then it will again perform a check of the unit's available memory capacity (57) and proceed to download more images as necessary (59). If the last picture on the electronic film has been downloaded then the unit 20 will prompt the operator (61) to erase the electronic film memory. Upon confirmation with the erase button 44, the intermediate storage unit 20 erases the electronic film memory (62).

Figure 4:
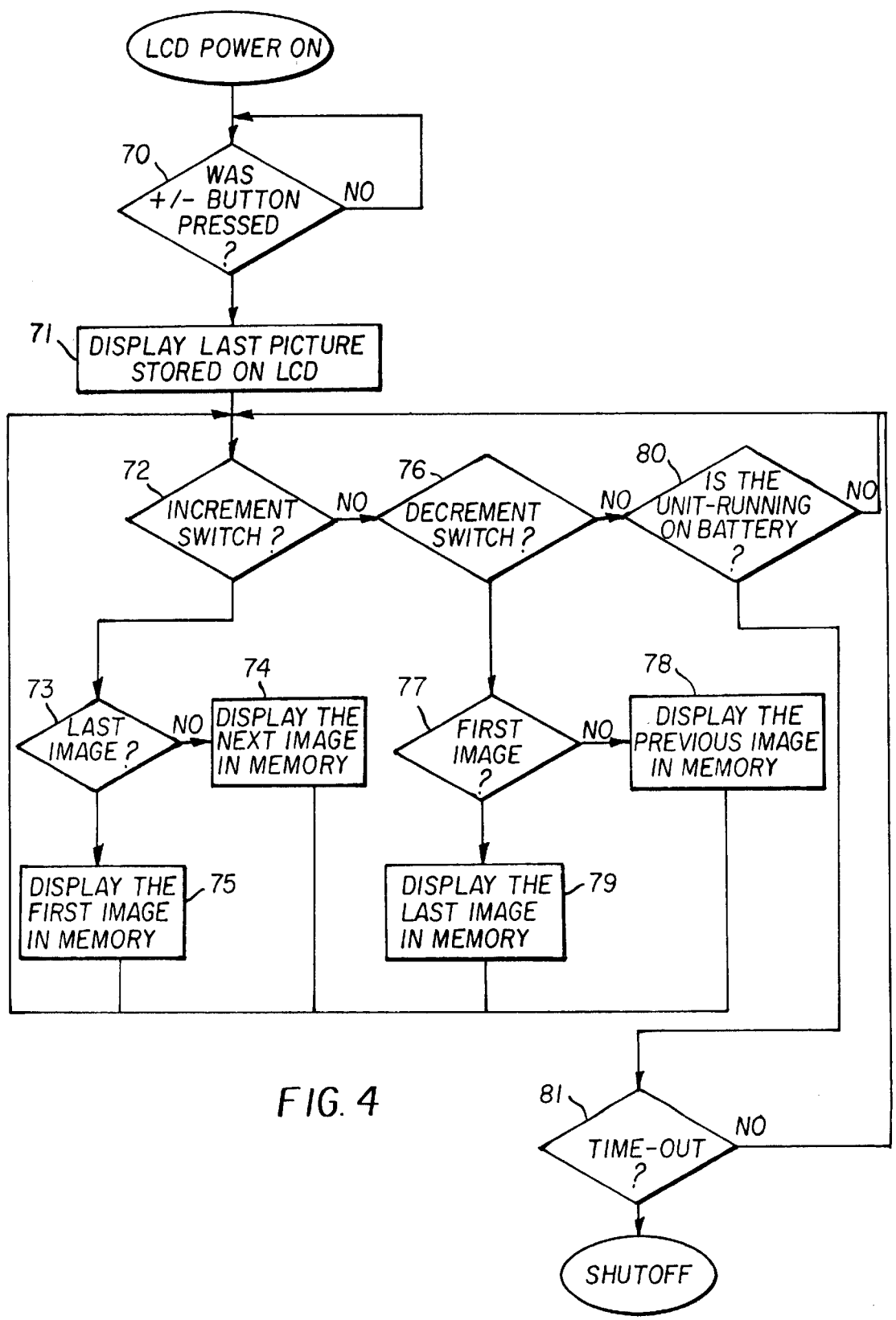
FIG. 4 is a flowchart showing the operation of the display controls.

Referring to FIG. 4, the intermediate storage unit 20 displays images on the display screen 32 as follows. After the display screen power on/off control 42 has been activated, the microcontroller waits (70) until the scroll control 48 is activated resulting in the last picture in memory 26 being displayed on the screen (71). If the increment half of the scroll control 48 is depressed (72), the microcontroller 28 checks to see if the last image in memory is being displayed (73). If so, the microcontroller 28 loads the first image in memory 26 onto the display screen 32 (75). Otherwise, the microcontroller 28 displays the next image in memory 26 on the display screen (74). The microcontroller 28 then waits for the scroll control 48 to be operated again. If the decrement half of the scroll control 48 had been depressed (76) instead of the increment half previously discussed, then the microcontroller 28 checks to see if the first image in memory 26 is being displayed (77). If so, the microcontroller 28 moves to the last image in memory 26 and displays that image (79). If the first image in memory is not being displayed, then the previous image in memory 26 is loaded onto the display screen 32 (78). If neither portion of the scroll control is depressed as previously discussed, the microcontroller 28 electronically checks to determine if the intermediate storage unit 20 is being powered by batteries or is plugged into an AC supply (80). If the unit is not being powered by batteries, then the microcontroller 28 will wait until the scroll control is activated. Otherwise, the microcontroller 28 determines whether a preset waiting period has expired (81). If this time limit is exceeded, then the microcontroller 28 shuts off the intermediate storage unit 20. If the time limit has not been exceeded, the microcontroller 28 will again wait for the scroll control 48 to be activated.

The invention has been described with reference to a preferred embodiment. However, it will be appreciated that variations and modifications can be effected by a person of ordinary skill in the art without departing from the scope of the invention.

| PARTS LIST | |
|---|---|
| 10 | Electronic film |
| 12 | Body |
| 14 | Tab |
| 16 | Image sensor |
| 18 | Electrical contacts |
| 20 | Intermediate storage unit |
| 22 | Connector |
| 24 | Communication interface |
| 26 | Non-volatile memory |
| 28 | Microcontroller |
| 30 | External communication interface |
| 32 | Visual display screen |
| 34 | Insertion switch |
| 36 | Cleaner |
| 37 | Computer interface slot |
| 38 | Personal Computer |
| 40 | Operator controls |
| 42 | Display on/off switch |
| 44 | Erase switch |
| 46 | Error Indicator |
| 48 | Scroll switch |
| 50 | Intermediate storage unit battery |
| 52 | Charging circuit |
| 54 | AC power supply plug |
| (56) | check film insertion step |
| (57) | check memory full step |
| (58) | activate error indicator step |
| (59) | down load one image step |
| (60) | check for last image on electronic film step |
| (61) | confirm erase film step |
| (62) | erase film step |
| (70) | check for scroll switch activation step |
| (71) | display last image step |
| (72) | check for increment step |
| (73) | check for last image in memory step |
| (74) | display next image step |
| (75) | display first image step |
| (76) | check for decrement step |
| (77) | check for first image in memory step |
| (78) | display previous image step |
| (79) | display last image step |

-continued

PARTS LIST

| (80) | check for batteries step |
| (81) | check of timeout step |

We claim:

1. An intermediate storage unit for use with electronic film having a body in the shape of a film cartridge and a tab, extending from the body and bearing an image sensor adapted to be located in the film plane of a conventional photographic camera and having electrical contacts for interfacing the electronic film with another electronic device, the electronic film being capable of storing a predetermined number of images, the intermediate storage unit comprising:

a) a data connector for connecting to the electrical contacts on the tab of the electronic film;
   b) a non-volatile semiconductor memory capable of storing at least twice as many images as the electronic film;
   c) a microcontroller connected to the data connector and the non-volatile memory for controlling the transfer of data from the electronic film to the non-volatile memory;
   d) a rechargeable battery connected to provide power to the memory and the microcontroller;
   e) a battery charger for recharging the rechargeable battery; and
   f) means responsive to the insertion of electronic film into the unit to initiate power up of the intermediate storage unit and download of the images.

2. The intermediate storage unit claimed in claim 1, further comprising means for cleaning the image sensor upon insertion of the electronic film into the intermediate storage unit.

3. The intermediate storage unit claimed in claim 1, wherein the electronic film contains a rechargeable battery and the intermediate storage unit further comprises battery charging means for charging the battery in the electronic film.

4. The intermediate storage unit claimed in claim 1, further comprising a display screen for previewing the images stored therein.

5. The intermediate storage unit claimed in claim 4, wherein the display is an LCD display.

6. The intermediate storage unit claimed in claim 1, wherein the non-volatile memory is a removable memory card.

7. The intermediate storage unit claimed in claim 1, wherein the non-volatile memory is non-removable and the intermediate storage unit further comprises an interface for downloading images to another electronic device.

8. An electronic film system, comprising:
   a) an electronic film, including
      i) a body in the shape of a film cartridge, and
      ii) a tab, extending from the body and bearing an image sensor adapted to be located in the film plane of a conventional photographic camera and having electrical contacts for interfacing the electronic film with another electronic device, the electronic film being capable of storing a predetermined number of images; and
   b) an intermediate storage unit, including
      i) a data connector for connecting to the electrical contacts on the tab of the electronic film;
      ii) a non-volatile semiconductor memory capable of storing at least twice as many images as the electronic film;
      iii) a microcontroller connected to the data connector and the non-volatile memory for controlling the transfer of data from the electronic film to the non-volatile memory;
   c) a rechargeable battery connected to provide power to the memory and the microcontroller;
   d) a battery charger for recharging the rechargeable battery; and
   e) means responsive to the insertion of electronic film into the unit to initiate power up of the intermediate storage unit and download of the images.

9. The electronic film system claimed in claim 8, further comprising a personal computer, and wherein the intermediate storage unit further comprises an interface for downloading images to the personal computer.

10. The electronic film system claimed in claim 8, wherein the electronic film contains a rechargeable battery and the intermediate storage unit further comprises battery charging means for charging the battery in the film.

11. The electronic film system claimed in claim 8, wherein the intermediate storage unit further comprises a display screen for previewing the images stored therein.

12. The electronic film system claimed in claim 8, wherein the display is an LCD display.

13. The electronic film system claimed in claim 8 wherein the non-volatile memory in the intermediate storage unit is a removable memory card.

14. An intermediate storage unit for use with electronic film having a body in the shape of a film cartridge and a tab, extending from the body and bearing an image sensor adapted to be located in the film plane of a conventional photographic camera and having electrical contacts for interfacing the electronic film with another electronic device, the electronic film being capable of storing a predetermined number of images, the intermediate storage unit comprising:

a) a data connector for connecting to the electrical contacts on the tab of the electronic film;
   b) a non-volatile semiconductor memory capable of storing at least twice as many images as the electronic film;
   c) a microcontroller connected to the data connector and the non-volatile memory for controlling the transfer of data from the electronic film to the non-volatile memory; and
   d) means for cleaning the image sensor upon insertion of the electronic film into the intermediate storage unit.

15. An electronic film system, comprising:
   a) an electronic film, including
      i) a body in the shape of a film cartridge, and
      ii) a tab, extending from the body and bearing an image sensor adapted to be located in the film plane of a conventional photographic camera and having electrical contacts for interfacing the electronic film with another electronic device; and
   b) an intermediate storage unit, including
      i) a data connector for connecting to the electrical contacts on the tab of the electronic film;
      ii) a non-volatile semiconductor memory capable of storing at least twice as many images as the electronic film;
      iii) a microcontroller connected to the data connector and the non-volatile memory for controlling the transfer of data from the electronic film to the non-volatile memory; and
      iv) means for cleaning the image sensor upon insertion of the electronic film into the intermediate storage unit.

* * * * *